(No Model.)
H. KROEKER.
GLASS VESSEL FOR SECONDARY BATTERIES, &c.
No. 537,575. Patented Apr. 16, 1895.
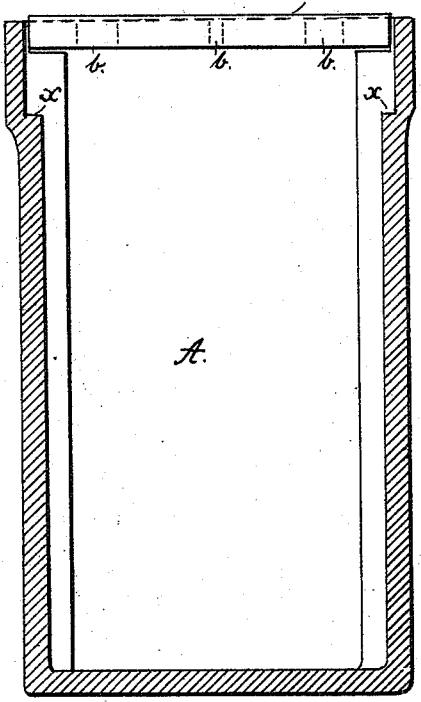
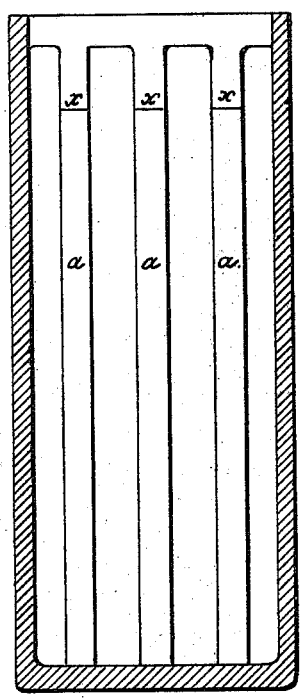
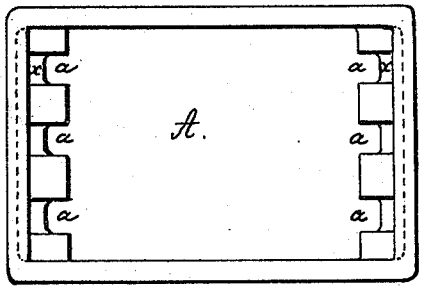
Witnesses,
Inventor,
Hugo Kroeker.

UNITED STATES PATENT OFFICE.

HUGO KROEKER, OF BERLIN, GERMANY.

GLASS VESSEL FOR SECONDARY BATTERIES, &c.

SPECIFICATION forming part of Letters Patent No. 537,575, dated April 16, 1895.

Application filed April 22, 1893. Serial No. 471,493. (No model.) Patented in England December 9, 1892, No. 22,639.

*To all whom it may concern:*

Be it known that I, HUGO KROEKER, a subject of the King of Prussia, residing at No. 54 Koepnicker Street, Berlin, Germany, have invented certain new and useful Improvements in Glass Vessels for Secondary Batteries or Accumulators, (for which I have obtained a patent in England, No. 22,639, dated December 9, 1892,) of which the following is a specification.

This vessel is intended to receive the electrodes of an accumulator in such a way that a safe and constant insulation of the plates from each other is effected. For this purpose the inside planes of the vessel A, which latter is made entirely of glass in any desired size and corresponding form, are furnished with any desired number of vertical grooves $a$ $a$ corresponding among themselves. Each two of the corresponding grooves serve for the reception of the plate. In the upper part of the glass-vessels the grooves are a little deeper, as at $x$, to form resting-plates for the holders of the electrodes; which holders must be made correspondingly wider than the plates. The electrodes, therefore, are freely suspended in the vessel without touching the bottom and can, therefore, be well surrounded and washed by the fluid (acid). When put into the grooves, the electrodes are completely separated from each other and cannot possibly touch one another, so that all other arrangements for insulation and safety, which might injure the effect, are rendered superfluous.

In the accompanying drawings, Figure 1 shows a side-view of the improved vessel. Fig. 2 is a plan view; and Fig. 3 is a vertical sectional view through the middle.

In the loose cover B which is likewise made of glass, there are openings $b$ for letting the exciter through or for the arrangements of the conductors of the current. The vessel can from this reason, be covered air-tight, which is effected by filling the points between the vessel and cover with caoutchouc or any other appropriate means.

I claim as my invention—

A rectangular vessel for accumulators having two internal parallel walls provided with parallel grooves extending to the bottom of the vessel and formed with projections or shoulders on their top; substantially as described and for the purpose specified.

In testimony whereof I have signed my name to this specification in the presence of two subscribing witnesses.

HUGO KROEKER.

Witnesses:
MAX. WILRICH,
ARTHUR WILRICH.